United States Patent [19]

Sugishima

[11] Patent Number: 4,943,870
[45] Date of Patent: Jul. 24, 1990

[54] IMAGE MAGNIFY/REDUCE APPARATUS

[75] Inventor: Kiyohisa Sugishima, Yokohama, Japan

[73] Assignee: Canon Kabushiki Kaisha, Tokyo, Japan

[21] Appl. No.: 428,415

[22] Filed: Oct. 30, 1989

Related U.S. Application Data

[63] Continuation of Ser. No. 116,255, Nov. 3, 1987, abandoned.

[30] Foreign Application Priority Data

Nov. 10, 1986 [JP] Japan ................................ 61-265651

[51] Int. Cl.$^5$ .......................... H04N 1/04; H04N 1/17
[52] U.S. Cl. ..................................... 358/451; 358/474; 358/486; 358/494; 358/497
[58] Field of Search ............... 358/451, 474, 486, 494, 358/497

[56] References Cited

U.S. PATENT DOCUMENTS

| | | | |
|---|---|---|---|
| 4,544,264 | 10/1985 | Bassetti et al. | 358/287 |
| 4,570,187 | 2/1986 | Ono et al. | 358/287 |
| 4,679,096 | 7/1987 | Nagashima | 358/287 |
| 4,686,580 | 8/1987 | Kato et al. | 358/287 |
| 4,701,808 | 10/1987 | Nagashima | 358/287 |
| 4,739,415 | 4/1988 | Toyono | 358/287 |
| 4,748,514 | 5/1988 | Bell | 358/288 |

FOREIGN PATENT DOCUMENTS 78274 4/1986 Japan .
88657 5/1986 Japan .
88658 5/1986 Japan .

Primary Examiner—Edward L. Coles, Sr.
Assistant Examiner—Jerome Grant
Attorney, Agent, or Firm—Fitzpatrick, Cella, Harper & Scinto

[57] ABSTRACT

An image magnifying/reducing apparatus has an element or system for reading a document image to output it as an image signal, and a processor for magnifying/reducing the image signal output by the read. The processor includes an element or system for changing a magnification/reduction factor during the magnifying/reducing process of the image signal, and can make such a change in the factor for each line.

19 Claims, 8 Drawing Sheets

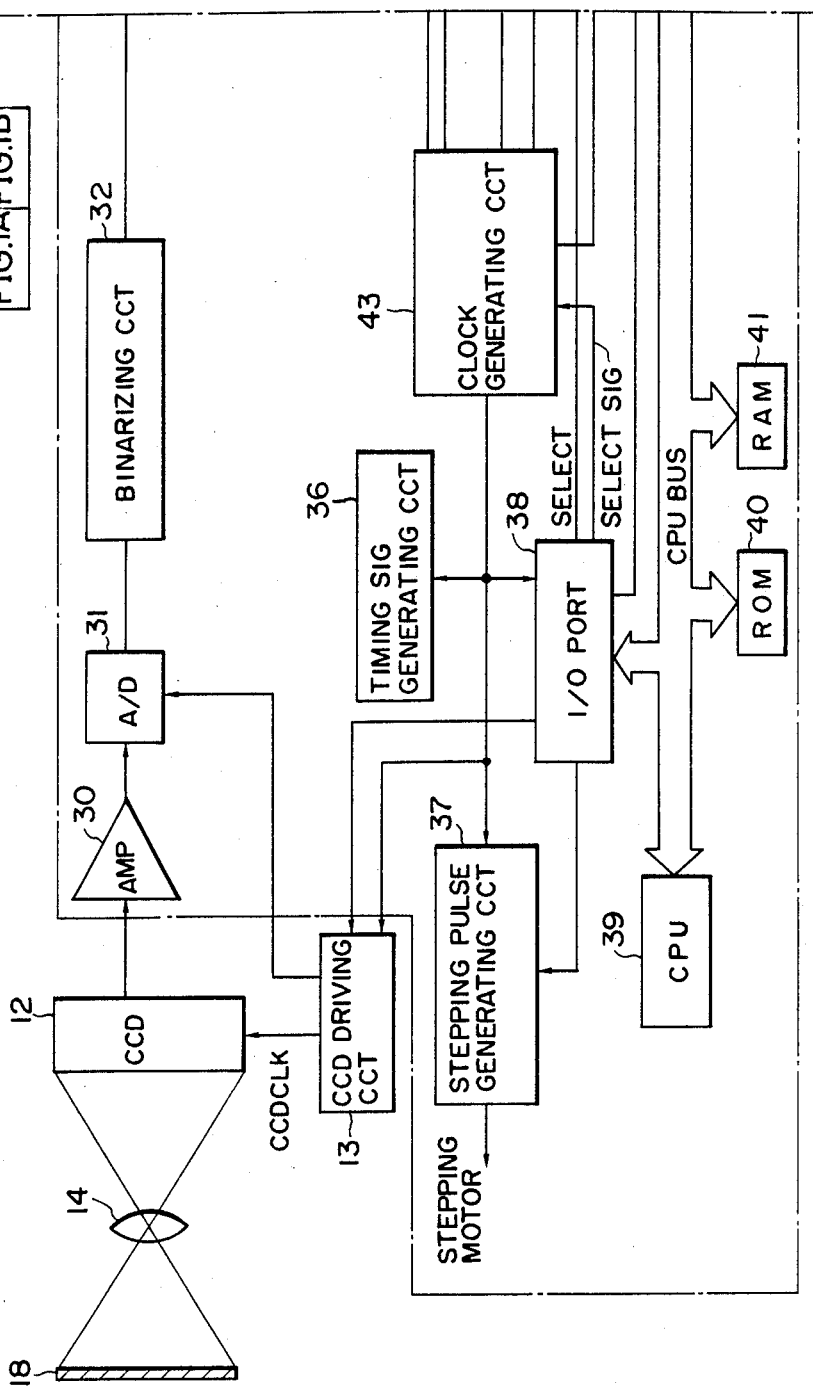

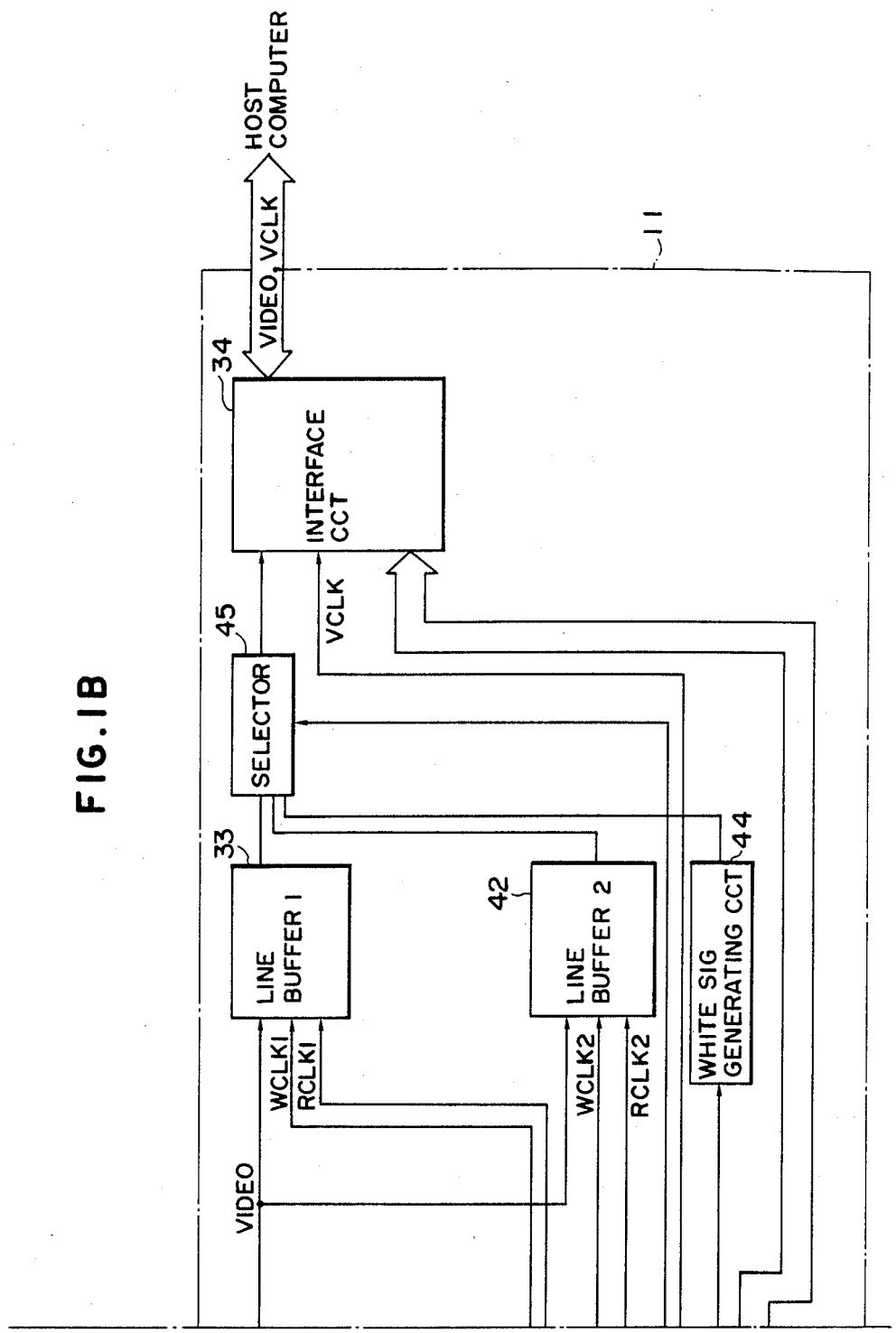

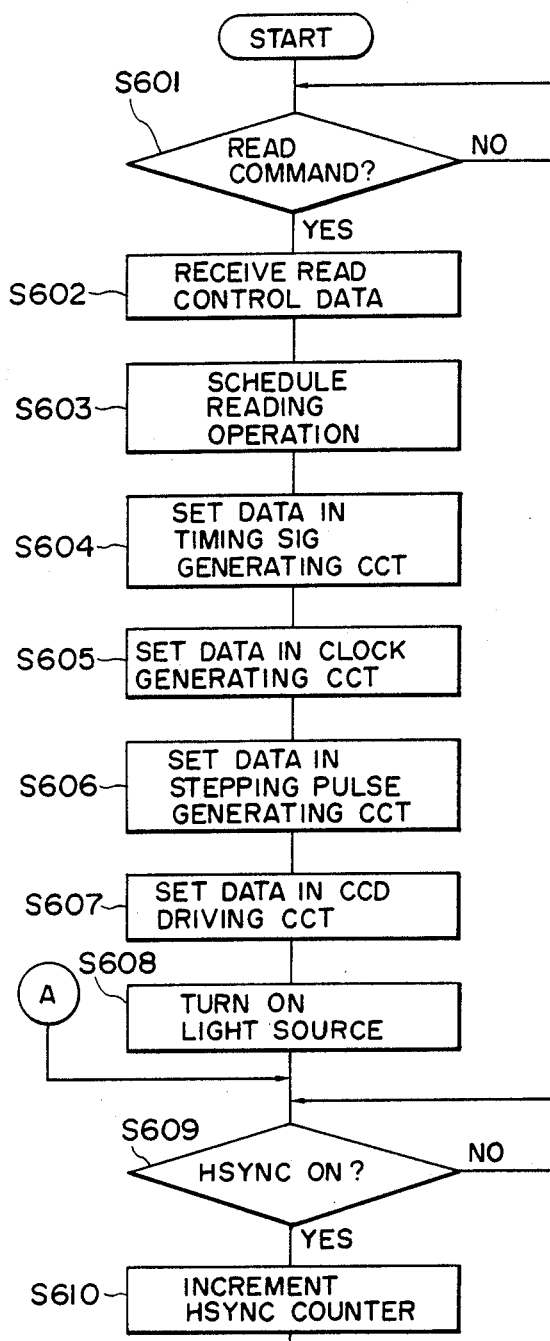

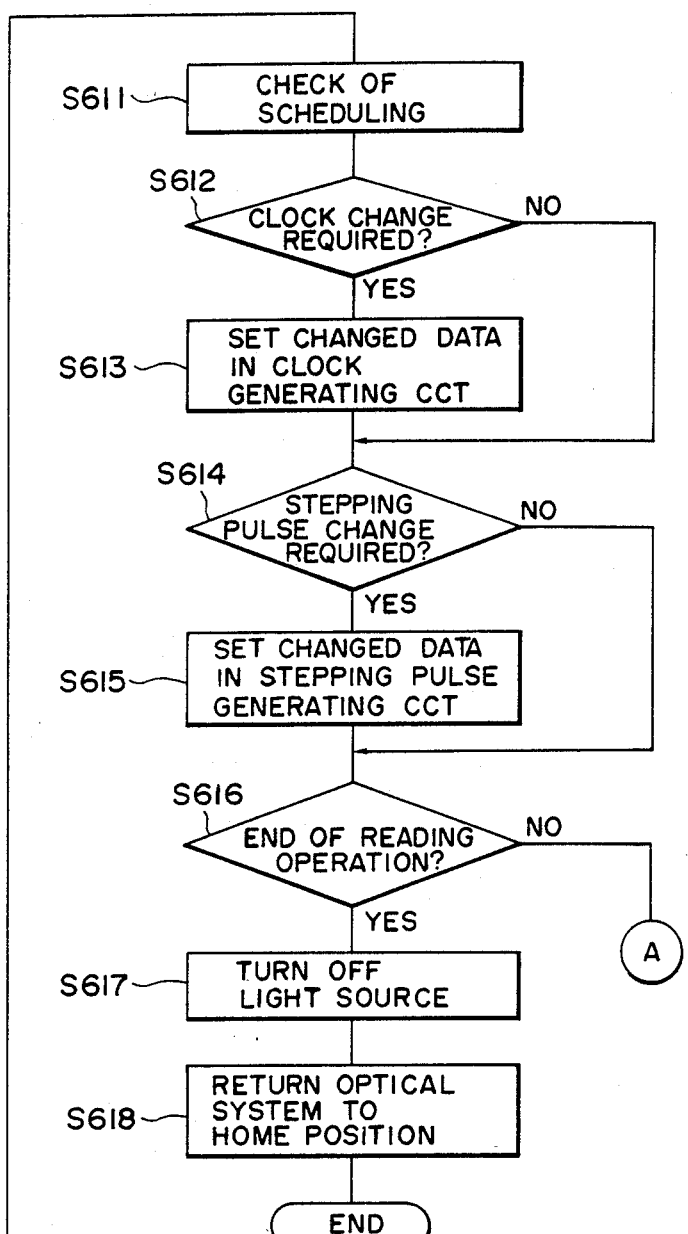

IMAGE MAGNIFY/REDUCE APPARATUS

This application is a continuation of application Ser. No. 116,255 filed Nov. 3, 1987, now abandoned.

BACKGROUND OF THE INVENTION

1. Field of the Invention

The present invention relates to an image magnification/reduction (or variable magnification) apparatus which magnifies and/or reduces an image.

2. Related Background Art

Many image readers which read documents and convert them to electrical image signals merely read the document at a constant magnification. Accordingly, even if a user desires to sequentially change a reproduction magnification of the document image in one screen, it cannot be accomplished because the apparatus has no such function.

Various apparatus for magnification and/or reducing an image have been known, for example from U.S. Pat. Nos. 4,561,024, 4,675,908, 4,679,096, 4,701,808 and 4,734,786, all assigned to the assignee of the present invention.

However, all of those apparatus magnify or reduce the document image at a constant magnification.

An apparatus for outputting images of different resolutions in one screen is disclosed in U.S. Pat. No. 4,528,561. However, it outputs images in accordance with codes and does not magnify or reduce the document image.

An apparatus for sequentially changing magnifying-/reduce factor of the document image in one screen is disclosed in U.S. patent application Ser. No. 06/891,463. However, it is in need of further improvement.

SUMMARY OF THE INVENTION

It is an object of the present invention to eliminate the disadvantages described above.

It is another object of the present invention to improve an image magnifying/reducing apparatus.

It is a further object of the present invention to provide an image magnifying/reducing apparatus which magnifies/reduces an image at a desired magnification.

It is another object of the present invention to provide an image magnifying/reducing apparatus which magnifies/reduces an image with a simple construction.

It is still another object of the present invention to provide an image magnifying/reducing apparatus which can vary a reproduction magnification of a document image in a screen. According to the present invention, these objects are attained, in part, by providing a magnifying/reducing apparatus in which an image signal is generated in units of a line and then processed, the processing including magnifying/reducing to output a variably-magnified signal. The magnifying/reducing means is to be capable of changing a magnifying/reducing factor by gradation for each predetermined line or lines. In another aspect, a scan means may be provided for scanning a document image, with drive means including a stepping motor and control means for controlling the drive means, e.g., by changing a scan speed by gradation during one scan of a document.

Other objects of the present invention will be apparent from the following description and claims.

BRIEF DESCRIPTION OF THE DRAWINGS

FIG. 1, consisting of FIGS. 1A and 1B, shows a block diagram of a scanner 1 of an embodiment of the present invention.

FIG. 6, which consists of FIGS. 6A and 6B, shows a flow chart of a control procedure in the embodiment of the present invention.

DETAILED DESCRIPTION OF THE PREFERRED EMBODIMENTS

Figure 2:
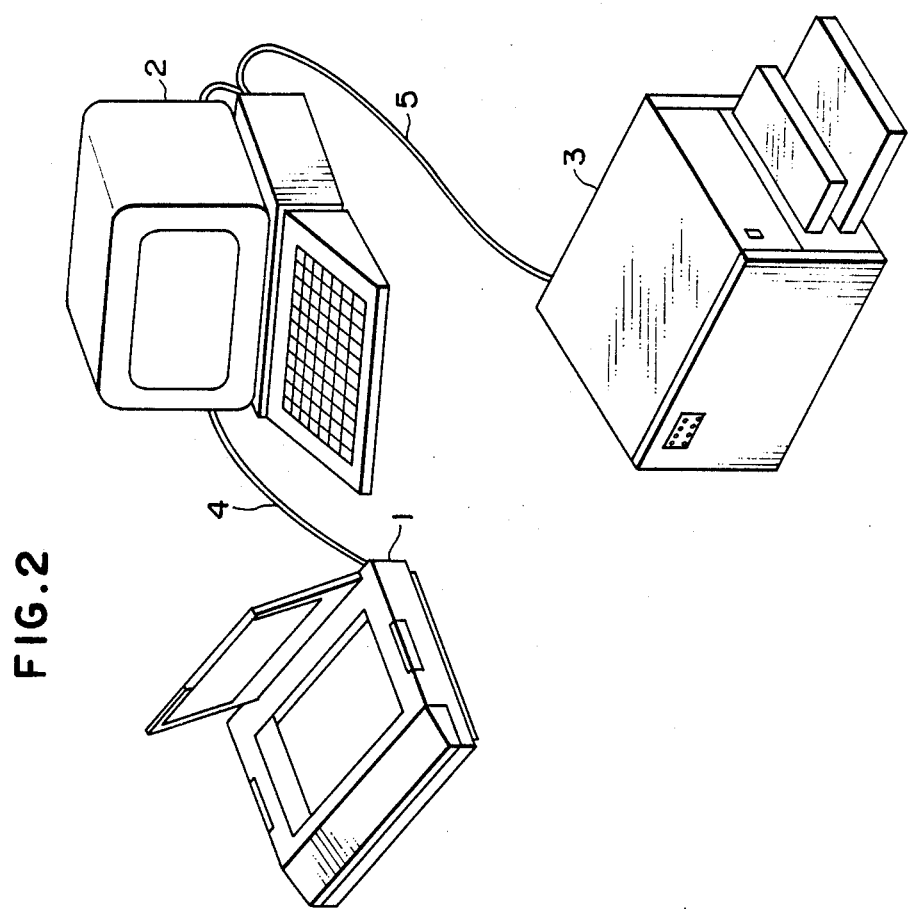
FIG. 2 shows an image processing system to which the present invention is applied.

FIG. 2 shows an outer view of an image processing system to which the present invention is applied.

In FIG. 2, numeral 1 denotes an image reader 1 or scanner which optically reads a document image and converts it to an electrical image signal. Numeral 2 denotes a hot computer having a CRT display and a keyboard. Image data may be entered by the scanner 1 and output to an image forming device 3 through intervention of an operator.

The image data entered from the scanner 1 by the operator is edited by the host computer 2. The host computer 2 further designates a magnification for read operation to the scanner 1 and indicates edit operation.

Numeral 3 denotes the image forming device (printer) such as a laser beam printer, which forms a reproduced image on a record sheet in accordance with an image signal output from the host computer 2. Numerals 4 and 5 denote transmission cables for connecting the scanner 1 and the host computer 2, and the printer 3 and the host computer 2, respectively. The image signal and various control signals are serially communicated therethrough.

Figure 3:
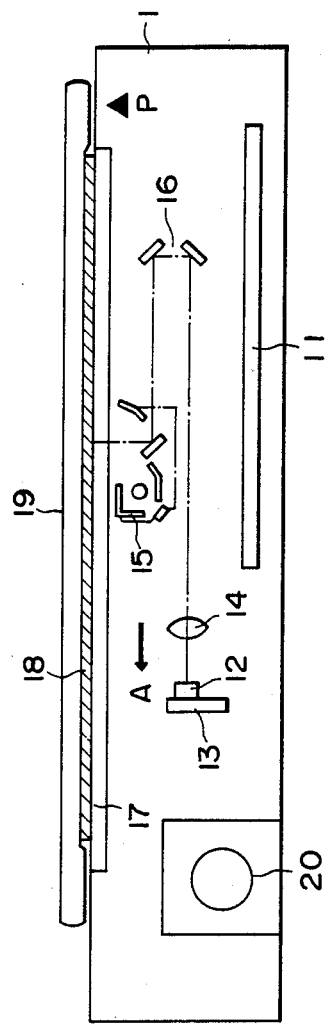
FIG. 3 shows a sectional view of the scanner 1 of the embodiment of the present invention.

FIG. 3 shows a construction of the document reader of the embodiment of the present invention.

In FIG. 3, numeral 11 denotes a control unit for controlling document scan operation of the scanner 1. Numeral 15 denotes a document illumination unit which is an optical unit having a reflection mirror 16.

The document illumination unit 15 illuminates a document 18 on a platen glass 17 while it is moved by a stopping motor 20 from a home position P in a direction A shown in FIG. 3. A reflected image of the illuminated document 18 passed through the document illumination unit 15 and a reflection mirror 16 and is focused onto a CCD 12 by a lens 14. Numeral 13 denotes a CCD driver which drives the CCD 12 and numeral 19 denotes a platen cover which retains the document. The document illumination unit 15 scans the document 18 at a speed corresponding to a preset magnification.

In the present embodiment, the scan in the direction A by the document illumination unit 15 is called a sub-scan, and a scan normal to the sub-scan is called a main scan (horizontal scan).

FIG. 1 shows a circuit configuration of the document reader (scanner) 1 of the embodiment of the present invention. The like elements to those shown in FIG. 3 are designated by the like numerals.

In FIG. 1, a CPU 39 controls a random access memory (RAM) 41, an I/0 port 38 and other portions of the scanner 1 through a CPU bus in accordance with a control program shown in FIG. 6 which is stored in a read-only memory (ROM) 40.

One main scan (horizontal) line of image of the document 18 is focused onto the CCD 12, and the focused image is read in synchronism with a CCD drive clock CCDCLK generated by a CCD driver 13, and it is amplified by an amplifier 30 and converted to an eightbit/pixel digital signal by an A/D converter 31. The digitized image signal passes through a binarization circuit 32 which produces a black/white binary signal, which is written into a line buffer 33 (line buffer 1) or 42 (line buffer 2) which can store one line of image signal, in synchronism with a write clock signal WCLK1 of WCLK2 generated by a clock generator 43.

Which one of the line buffers the image signal is to be written in is determined by which on the clock generator 43 supplies a clock to when the CPU 39 sends a selector signal to the clock generator 43 through the I/0 port 38.

A timing signal generator 36 generates a synchronous signal HSYNC indicating a main scan (horizontal) timing. The clock generator 43 generates write clocks WCLK1 and WCLK2 to the line buffer 33 or 42, read clocks RCLK1 and RCLK2 for reading an image signal from the line buffer 33 or 42, and an image signal synchronization clock VCLK for sending the image signal to an external unit such as a host.

The image signals written in the line buffers 33 and 42 are read by the read clocks RCLK1 and RCLK2 generated by the clock generator 43, synchronized with the image signal synchronization clock VCLK by the interface circuit 34 and then supplied to the host computer 2. The interface circuit 34 output the image signal VIDEO and a synchronization clock VCLK, receives a command to output the image signal and a command for a read magnification from the host computer 2, and sends such commands to the CPU 39.

A white signal generator 44 outputs a white signal as the image signal. It is used to make a margin when the document is read in a reduced scale.

Whether the image signal outputted from the line buffer 33 or 42 or the white signal generated by the white signal generator 44 is selected is determined by a selector 45 to which the CPU 39 sends a select signal through the I/0 port 38 so that margin for the reduced reproduction is prepared.

The clock generator 43 and the stepping pulse generator 37 operate in synchronism with a synchronization signal HSYNC of a predetermined period supplied from the timing generator 36. The stepping pulse generator 37 supplies to a stepping motor a pulse having a period determined by a preset magnification. The stepping motor rotates at a speed determined by the input pulse to drive the optical unit 15 in the sub-scan direction.

Figure 4A:
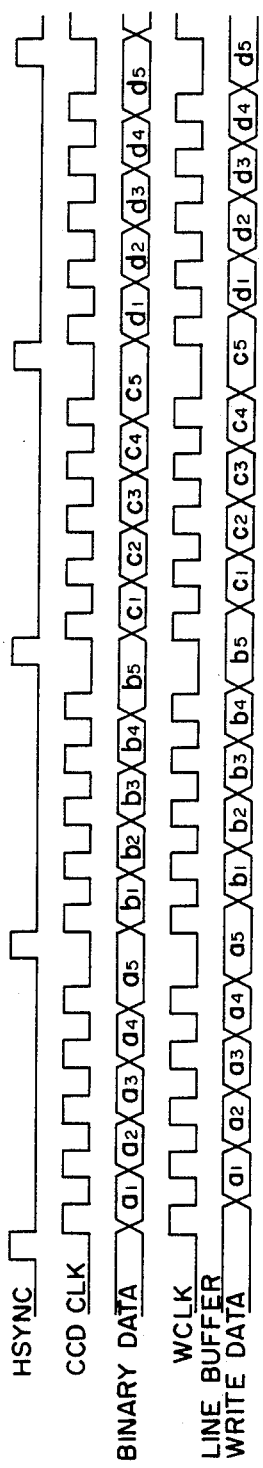
FIGS. 4A, 4B and 5 show timing charts of image signal processing and scanner operation in the embodiment of the present invention.
Figure 4B:
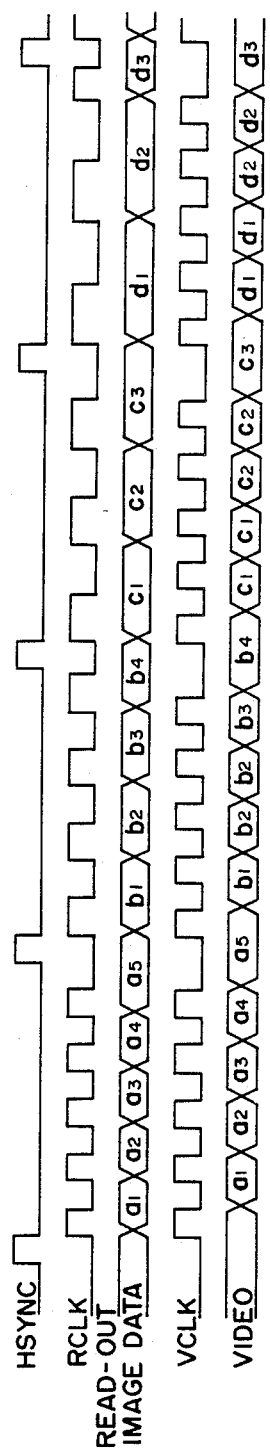

Referring to FIGS. 4A and 4B, serial magnifying/reducing operation in the main scan (horizontal) direction is explained.

In the present embodiment, a read clock CCDCLK of the CCD 12 and an image signal synchronization clock VCLK is fixed to a frequency for unity magnification (100%). In a reducing operation, the frequency of the write clock WCLK to the line buffer 33 or 42 is lowered while the read clock RCLK is equal to the frequency for the unity magnification (100%) so that the document image is reduced. In a magnifying operation, the write clock WCLK is equal to the frequency for the unity magnification and the read clock RCLK is slower than the write clock so that the document image is magnified.

Referring to FIG. 4A, the write timing to the line buffer 33 in the magnify operation is explained.

The write clock WCLK to the line buffer 33 or 42 is carried out at the same period (100%) as that of the CCD clock CCDCLK. Accordingly, the binary data (image information) read from the CCD 12 by the CCD clock CCDCLK is latched at the fall of the write clock WCLK and is written into the line buffer 33.

The CCD clock CCDCLK and the write clock WCLK are output in synchronism with the horizontal synchronization signal HSYNC. The present embodiment is directed as though the number of clocks for read data were five per main scan although the actual number it usually 4768 per main scan for a size A4 document.

FIG. 4B shows a read timing of the image data written in the line buffer 33.

In the serial magnifying mode, the document image is magnified by lowering the frequency of the read clock RCLK from the line buffer 33. As shown in FIG. 4B, the read clock RCLK is sequentially set to a lower frequency in synchronism with the horizontal synchronization signal HSYNC. For each horizontal synchronization signal HSYNC, a frequency division rate is instructed to the clock generator 43 from the CPU 39 of FIG. 1 through the I/0 port 38, to set the frequency of the clock RCLK.

As the frequency of the read clock RCLK is linessequentially lowered, the change rate of the read image data is also lowered. Since the image signal synchronization clock VCLK supplied to the external equipment is always of constant period, the external output image signal VIDEO synchronized by the clock VCLK a duplicate of the same image for a plurality of clocks, and the image output by the image forming device 3 appears line-sequentially magnified.

In this manner, the magnification in the main scan direction is easily attained by reducing the frequency of the read clock RCLK applied to the line buffer in accordance with the magnification factor. The frequency of the image signal synchronization clock VCLK is always constant and the image signal synchronization clock VCLK acts as a sample clock of the image signal read from the line buffer.

In FIG. 4B, the image signal VIDEO outputted from the scanner 1 is shown as five pixels/line although as many pixels per line as the number determined by the magnification factor are actually output.

The reducing operation in the main scan direction in the present embodiment is now explained. In the present embodiment, as described above, the reduction is done when the binarized data is written into the line buffer 33 or 42. The binarizing circuit 32 always outputs the binarized data in synchronism with the clock CCDCLK of the constant frequency. On the other hand, the frequency of the write clock WCLK is lowered in accordance with the reduction factor and the binarized data is sampled by the write clock WCLK of the reduced frequency, and it is written into the line buffer. By sequentially reducing the frequency of the write clock WCLK for each line, an image which is line-sequentially reduced is reproduced.

The frequency of the read clock RCLK and the frequency of the image signal synchronization clock VCLK in the reduction mode are always constant and equal to those in the unity magnification mode.

Figure 5:
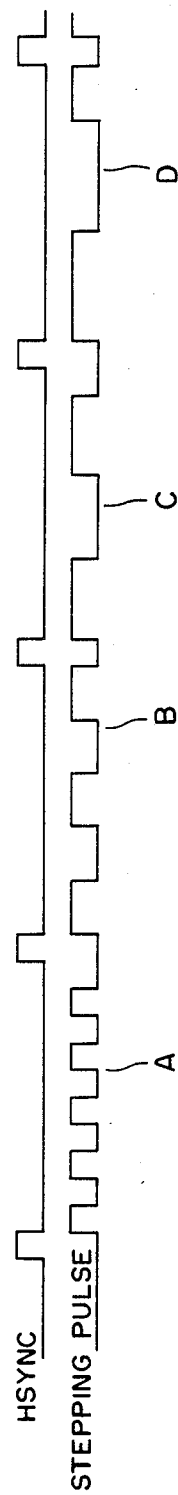

FIG. 5 shows a control timing in a sub-scan direction in the present embodiment.

In the present embodiment as shown in FIG. 3, the document is read by moving the optical system. Accordingly, after the CCD 12 has read one line of document, the illumination unit 15 is moved by one line by the stepping motor 20.

In the present embodiment, when a pulse is applied to the stepping motor 20, the read position is moved by one line (in 200% maximum magnification mode).

A pitch of one line at the maximum magnification factor in the sub-scan direction, for example, 200% is set as a reference distance. Accordingly, at the 200% magnification factor, one pulse supplied to the stepping motor corresponds to one line, and when the image is to be output at a magnification factor lower than 200%, the number of pulses supplied to the stepping motor 20 for each line is increased inversely proportionally to the magnification factor. As a result, the lower the magnification factor is, the larger is the number of pulses for one line and the larger is the distance of movement of the read position for one line in the sub-scan direction.

FIG. 5 shows a drive timing of the stepping motor 20.

In FIG. 5, the number of stepping pulses supplied to the stepping motor 20 during the duration of the horizontal synchronization signal HSYNC corresponds to the distance of movement of the read position in the sub-scan direction. At a waveform portion A shown in FIG. 5, there are five stepping pulses and the read position is moved by five lines of the 200% magnification mode in the sub-scan direction during one main scan period. At a waveform portion D, there are two pulses and the read position is moved by two lines of the 200% magnification mode during one main scan.

In the present embodiment, the CPU 39 controls the pulse data to be supplied to the stepping pulse generator 37 through the I/0 port 38 shown in FIG. 1 for each line image output, that is, it changes the number of pulses to be supplied to the stepping motor for each line image output. As a result, the interval of sub-scan lines in one scan of the document can be sequentially changed and the magnification factor can be sequentially changed in the sub-scan direction.

FIG. 6, consisting of FIGS. 6A and 6B, shows a control procedure of the CPU 39 in the present embodiment.

In FIG. 6 the presence or absence of a read command sent from the host computer 2 through the interface circuit 34 is checked (step S601), and if it is present, read control information such as read size, magnification factor and distance from the home position is received from the host computer 2 (step S602).

Based on this information, data to be set into the clock generator 43 and the stepping pulse generator 37, such as the clock corresponding to the horizontal synchronization signal HSYNC and the number of stepping pulses, in accordance with the sheet size in the read operation and the magnification factor, are scheduled in a table (step S603).

The period of the synchronization signal HSYNC is calculated based on the read size, and the calculated data is set into the timing generator (step S604). Then, the clock data is set into the clock generator 43, stepping pulse generator 37 and CCD driver 13 (steps S605, S606, and S607).

Then, the light of the illumination unit 15 is turned on (step S608), and whether the horizontal synchronization signal HSYNC has been generated by the timing signal generator 36 or not is checked (step S609).

When the horizontal synchronization signal HSYNC is generated, the HSYNC counter is incremented (step S610), and the scheduling table previously proposed is referenced (step S611), and if the clock and the stepping pulse are changed, the changed data is set into the respective circuit (step S612-S615).

Then, whether the document of the present read size has been read or not is checked, and if it has not been read, the process returns to the HSYNC check of the step S609 (step S616). After the reading has been completed, the light is turned off (step S617), the optical system is returned to the home position (step S618) and the control process is terminated.

When the number of stepping motor pulses is not represented by an integer in the magnifying/reducing mode, integer correction may be made in the scheduling step (step S603).

In the present embodiment, the magnifying/reducing data is received from the host computer 2. Alternatively, input means such as magnifying/reducing key may be provided in the scanner 1 to enter the magnifying/reducing data.

While the read information is recorded by the printer 3 in the present embodiment, the read image may be supplied to the display of the host computer 2 to display the image in a magnified or reduced scale.

The horizontal synchronization signal HSYNC may be a beam detect (BD) signal supplied from a laser beam printer.

The present invention is not limited to the illustrated embodiment but various modifications may be made without departing from the scope of the invention, which is to be determined by the appended claims.

I claim:

1. An image magnifying and/or image reducing apparatus comprising:
   image signal generating means for generating an image signal in units of a line; and
   processing means for processing an image signal generated in units of a line by said image signal generating means,
   wherein said processing means includes at least one of (1) means for magnifying and (2) means for reducing an image signal generated in units of a line, to output a variably-magnified or variably-reduced signal, respectively, and said magnifying means or reducing means, respectively, is capable of changing a magnifying or reducing factor, respectively, by gradation for each N lines, N being a positive integer.

2. An image magnifying and/or image reducing apparatus according to claim 1, wherein said processing means includes means for binarizing an image signal generated in units of a line and said magnifying means or reducing means, respectively, magnifies or reduces a binary signal output in units of a line from said binarizing means.

3. An image magnifying and/or image reducing apparatus according to claim 1, wherein said image signal generating means includes means for reading a document image line by line to output an image signal in units of a line, and means for driving said reading means to scan a document, said driving means being capable of changing a scan speed of said reading means in plural steps during one scan for document image reading.

4. An image magnifying and/or image reducing apparatus according to claim 3, wherein said drive means includes a stepping motor actuated in response to an input pulse, and wherein said processing means includes means for generating a sync signal for outputting an image signal in units of a line from said document image reading means and means for generating said input pulse, the number of such input pulses being changed in association with generation of said sync signal.

5. An image magnifying and/or image reducing apparatus comprising:
scan means for scanning a document image;
driving means for driving said scan means, said drive means having a stepping motor; and
control means for controlling said drive means to control the scan operation of said scan means,
said control means controlling said drive means to change a scan speed of said scan means by gradation during one scan of a document for document image reading.

6. An image magnifying and/or image reducing apparatus according to claim 5, wherein said drive means is actuated in response to an input pulse, and wherein said control means includes means for generating a sync signal having a predetermined period and means for generating said input pulse on the basis of said sync signal, the number of such input pulses being changed by gradation in association with generation of said sync signal in order to vary a scan speed of said scan means gradually.

7. An image magnifying and/or image reducing apparatus according to claim 6, wherein said scan means includes means for reading a document image line by line to output an image signal in units of a line and at least one of (1) means for magnifying and (2) means for reducing an image signal output in units of a line from said document image reading means to output a variably-magnified or variably-reduced signal, respectively, and said magnifying means or reducing means is respectively capable of changing a magnifying or reducing factor gradually for each N lines, N being a positive integer.

8. An image magnifying and/or image reducing apparatus according to claim 7, wherein said document image read means outputs an image signal in synchronism with said sync signal.

9. An image magnifying and/or image reducing apparatus comprising:
image signal generating means for generating an image signal; and
at least one of (1) image magnification processing means and (2) reduction processing means, respectively for magnifying and for reducing an image signal output by said image signal generation means, wherein said magnification processing means or reduction processing means, respectively, is capable of changing a magnifying or a reducing factor, respectively, in a predetermined period.

10. An image magnifying and/or image reducing apparatus according to claim 9, wherein said image signal generating means includes means for reading a document image line by line to output an image signal in units of a line, and wherein said magnification processing means or reduction processing means, in units of a line, magnifies or reduces, respectively, an image signal output in units of a line from said document image reading means.

11. An image magnifying and/or image reducing apparatus according to claim 10, wherein said magnification processing means or reduction processing means is capable of changing a magnifying or reducing factor, respectively, by gradation for each N lines, N being a positive integer.

12. An image magnifying and/or image reducing apparatus according to claim 1, wherein said magnifying means or reducing means, respectively, includes buffer means for storing an image signal, and wherein said magnifying means or reducing means, respectively, performs image reducing operation upon storing the image signal in said buffer means, and performs an image magnifying operation upon reading out of the image signal from said buffer means.

13. An image magnifying and/or image reducing apparatus according to claim 1, wherein said magnifying or reducing means, respectively, is capable of changing a magnifying factor or reducing, factor, respectively, gradually for each one line.

14. An image magnifying and/or image reducing apparatus according to claim 7, further comprising binarizing means for binarizing an image signal output in units of a line from said document image reading means, wherein said magnifying means or reducing means, respectively, magnifies or reduces a binary signal output in units of a line from said binarizing means.

15. An image magnifying and/or image reducing apparatus according to claim 10, wherein said magnification processing means or reduction processing means, respectively, includes buffer means for storing an image signal, and wherein said magnification processing means or reduction processing means, respectively, performs an image reducing operation upon storing the image signal in said buffer means, and performs an image magnifying or reducing operation, respectively, upon reading out of the image signal from said buffer means.

16. An image magnifying and/or image reducing apparatus according to claim 10, further comprising means for generating a sync signal in a predetermined period, said sync signal being adapted for outputting an image signal in units of a line from said original image reading means, wherein said magnification processing means or reduction processing means, respectively, changes a magnifying or reducing factor, respectively, by gradation on the basis of said sync signal.

17. An image magnifying and/or image reducing apparatus according to claim I, wherein said processing means includes both said magnifying means and said reducing means.

18. An image magnifying and/or image reducing apparatus according to claim 7, wherein said scan means includes both said magnifying means and said reducing means.

19. An image magnifying and/or image reducing apparatus according to claim 9, comprising both said magnification processing means and said reduction processing means.

* * * * *

UNITED STATES PATENT AND TRADEMARK OFFICE
CERTIFICATE OF CORRECTION

PATENT NO. : 4,943,870
DATED : July 24, 1990
INVENTOR(S) : KIYOHISA SUGISHIMA

It is certified that error appears in the above-identified patent and that said Letters Patent is hereby corrected as shown below:

IN [57] ABSTRACT

Line 7, "process" should be deleted.

COLUMN 1

Line 21, "magnification" should read --magnifying--.
Line 22, "example" should read --example,--.
Line 34, "/reduce" should read --/reducing--.

COLUMN 2

Line 24, "hot" should read --host--.
Line 51, "passed" should read --passes--.

COLUMN 3

Line 4, "and" should be deleted.
Line 7, "eigh-" should read --eight- --.
Line 8, "tbit/pixel" should read --bit/pixel--.
Line 13, "of" should read --or--.
Line 16, "on" should read --one--.
Line 34, "output" should read --outputs--.
Line 61, "is" should read --are--.

COLUMN 4

Line 4, "magnify" should read --magnifying--.
Line 30, "lines-" should read --line- --.
Line 35, "a" should read --is a--.

UNITED STATES PATENT AND TRADEMARK OFFICE
CERTIFICATE OF CORRECTION

PATENT NO. : 4,943,870

DATED : July 24, 1990

INVENTOR(S) : KIYOHISA SUGISHIMA

It is certified that error appears in the above-identified patent and that said Letters Patent is hereby corrected as shown below:

COLUMN 6

Line 8, "circuit" should read --circuits--.
Line 22, "as" should read --as a--.

COLUMN 8

Line 22, "reducing," should read --reducing--.
Line 53, "claim I," should read --claim 1,--.

Signed and Sealed this

Twenty-seventh Day of April, 1993

Attest:

MICHAEL K. KIRK

*Attesting Officer*   *Acting Commissioner of Patents and Trademarks*